(12) United States Patent
Konno et al.

(10) Patent No.: US 7,936,385 B2
(45) Date of Patent: May 3, 2011

(54) IMAGE PICKUP APPARATUS AND IMAGING METHOD FOR AUTOMATIC MONITORING OF AN IMAGE

(75) Inventors: Georgero Konno, Kanagawa (JP); Makoto Usami, Kanagawa (JP)

(73) Assignee: Sony Corporation, Tokyo (JP)

( * ) Notice: Subject to any disclaimer, the term of this patent is extended or adjusted under 35 U.S.C. 154(b) by 672 days.

(21) Appl. No.: 11/948,883

(22) Filed: Nov. 30, 2007

(65) Prior Publication Data

US 2008/0151078 A1    Jun. 26, 2008

(30) Foreign Application Priority Data

Dec. 20, 2006    (JP) ............................... P2006-343004

(51) Int. Cl.
*H04N 5/262*    (2006.01)
(52) U.S. Cl. ............... 348/240.99; 348/169; 348/208.14
(58) Field of Classification Search ............ 348/240.99, 348/240.1–240.3, 208.13, 169, 208.14
See application file for complete search history.

(56) References Cited

U.S. PATENT DOCUMENTS

| 6,507,366 B1 * | 1/2003 | Lee ............................... 348/352 |
| 2004/0233282 A1 * | 11/2004 | Stavely et al. ................ 348/143 |
| 2009/0175496 A1 * | 7/2009 | Kondo et al. ................. 382/103 |

FOREIGN PATENT DOCUMENTS

| JP | 2002-374521 | 12/2002 |
| JP | 2004-015516 | 1/2004 |
| JP | 2006-115525 | 4/2006 |
| JP | 2006-245650 | 9/2006 |

* cited by examiner

*Primary Examiner* — Gevell Selby
(74) *Attorney, Agent, or Firm* — Finnegan, Henderson, Farabow, Garrett & Dunner, L.L.P.

(57) ABSTRACT

An embodiment of the invention provides an image pickup apparatus to which a zoom lens having a variable imaging angle of view is mounted, including: a dynamic body detecting portion for detecting a dynamic body from an image signal obtained by capturing an image; a motion vector detecting portion for detecting a motion vector representing an amount of motion per unit time of the dynamic body detected by the dynamic body detecting portion; a comparing portion for comparing the motion vector detected by the motion vector detecting portion with a reference value; and a control portion for adjusting a set value for an angle of view of the zoom lens based on a comparison result obtained in the comparing portion.

4 Claims, 11 Drawing Sheets

STRUCTURAL EXAMPLE

STRUCTURAL EXAMPLE

EXAMPLE OF JUDGMENT BASED ON MOTION VECTOR SIZE

EXAMPLE OF ADJUSTMENT BASED ON COMPARISON WITH SPECIFICATION FRAME

EXAMPLE WHEN DYNAMIC BODY IS ESTIMATED TO GET OUT OF SPECIFICATION FRAME AFTER LAPSE OF UNIT TIME

PHOTOGRAPHING ANGLE OF VIEW OF CAMERA

EXAMPLE WHEN DYNAMIC BODY HAS PROPER SIZE SO AS TO BE JUST LOCATED WITHIN SPECIFICATION FRAME AFTER LAPSE OF UNIT TIME

EXAMPLE WHEN DYNAMIC BODY IS EXCESSIVELY SMALL

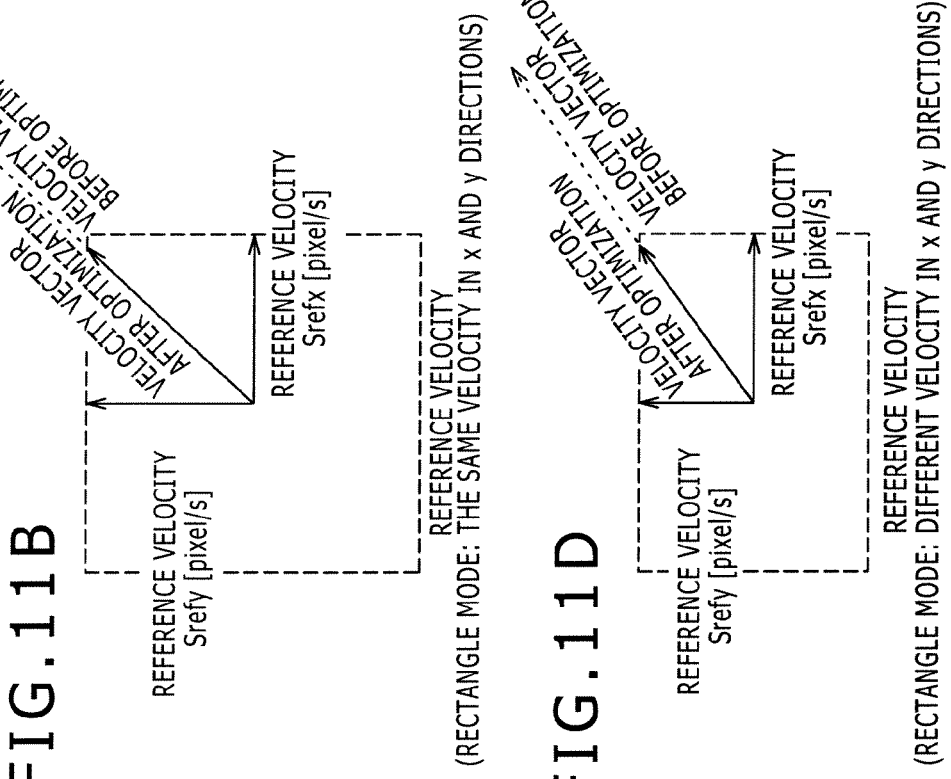
FIG.11A
FIG.11B
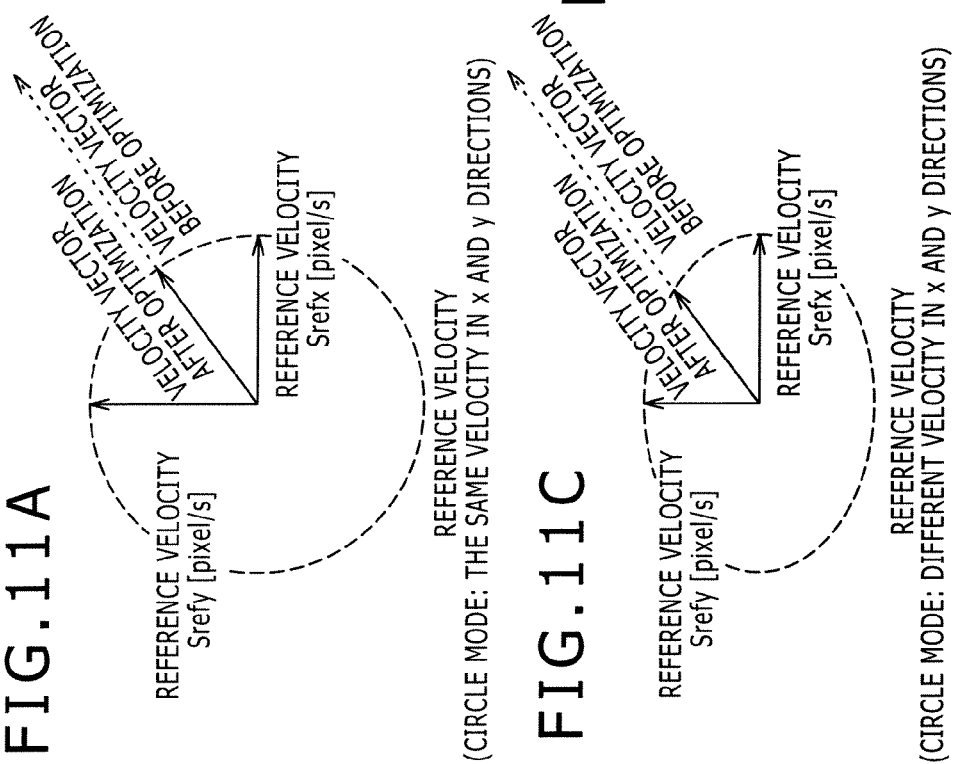
FIG.11C
FIG.11D

IMAGE PICKUP APPARATUS AND IMAGING METHOD FOR AUTOMATIC MONITORING OF AN IMAGE

CROSS REFERENCES TO RELATED APPLICATIONS

The present invention contains subject matter related to Japanese Patent Application No. 2006-343004 filed in the Japan Patent Office on Dec. 20, 2006, the entire contents of which being incorporated herein by reference.

BACKGROUND OF THE INVENTION

1. Field of the Invention

The present invention relates to an image pickup apparatus which, for example, is suitable for being applied to a video camera for a monitoring apparatus, and an imaging method applied to the same, and more particularly to a technique for capturing an image so as to follow a dynamic body in a captured image.

2. Description of Related Art

Heretofore, some video cameras (monitoring cameras) used as monitoring apparatuses to execute processing in which portions within a captured image are image-recognized and a moving object such as a vehicle is detected or a person such as an intruder is detected based on the results of the image recognition. Data obtained as the results of detecting such a moving object, for example, is outputted as data accompanying video data. On a monitor side for performing the monitoring by displaying the image data outputted from the monitoring apparatus, for example, alarm display representing that there is an intruder is performed by using detection data on the moving object. Or, when there is the moving object, the image data at that time is recorded in a recording apparatus.

On the other hand, others include zoom lenses as photographing lenses mounted to respective monitoring cameras. The mounting of the zoom lens to the monitoring camera makes it possible to adjust an angle of view at which an image of an object is captured. For example, an observer can execute processing for zooming up a specific portion in a monitored image while monitoring an image of a specific place displayed on a monitor by his/her manipulation. As a result, the more effective monitoring can be carried out. In addition, others are installed as monitoring cameras through movable mechanisms each being called a pan-tilter. The use of this pan-tilter results in that horizontal rotary drive and drive in an elevation direction of the monitoring camera can be carried out, thereby making it possible to adjust a monitoring direction. In general, the drive for the monitoring camera by using the pan-tilter, for example, is also carried out by a manipulation made by the observer who monitors an image displayed on the monitor.

Japanese Patent Laid-Open No. 2006-245650 describes a structural example of a monitoring video camera as the related art.

SUMMARY OF THE INVENTION

Now, during the monitoring using the monitoring video camera, if the observer does not perform the manipulation, but the monitoring apparatus can automatically follow the intruder or the like becoming a monitoring object, this is preferable because a burden imposed on the observer is reduced. However, for example, when a moving portion in the monitored image is simply zoomed up, if the detected moving object moves quickly, conversely, the object becoming the monitoring object may become out of the angle of view of the captured image. As a result, a situation may occur in which the captured image cannot be monitored.

Likewise, it is difficult to simply adjust the direction as well of the imaging using the pan-tilter only depending on a state of the captured image. With regard to the automatic adjustment by the pan-tilter which is carried out in the past, in general, the imaging direction of the camera is moved for a given period of time. In this case, such a motion has no connection with the state of the monitored image. Thus, the too high control is not performed.

The present invention has been made in the light of the foregoing, and it is therefore desirable to provide an image pickup apparatus and an imaging method each of which is capable of satisfactorily performing automatic monitoring based on a captured image.

According to an embodiment of the present invention, there is provided an image pickup apparatus to which a zoom lens having a variable imaging angle of view is mounted, including: a dynamic body detecting portion for detecting a dynamic body from an image signal obtained by capturing an image; a motion vector detecting portion for detecting a motion vector representing an amount of motion per unit time of the dynamic body detected by the dynamic body detecting portion; a comparing portion for comparing the motion vector detected by the motion vector detecting portion with a reference value; and a control portion for adjusting a set value for an angle of view of the zoom lens based on a comparison result obtained in the comparing portion.

According to the embodiment having the constitution described above of the present invention, it is judged whether or not the position of the dynamic body estimated based on the motion vector is proper. Thus, the angle of view of the zoom lens is properly adjusted based on the estimated position of the dynamic body.

In addition, according to another embodiment of the present invention, there is provided an imaging method of capturing an image by using a zoom lens having a variable imaging angle of view, including the steps of: detecting a dynamic body from an image signal obtained by capturing the image; detecting a motion vector representing an amount of motion per unit time of the dynamic body detected in the dynamic body detecting step; and comparing the motion vector detected in the dynamic body detecting step with a reference value, and adjusting a set value for an angle of view of the zoom lens based on a comparison result.

According to the embodiments described above of the present invention, the angle of view of the zoom lens can be properly adjusted on the estimated portion of the dynamic body. As a result, the image of the dynamic body can be automatically captured at the proper size.

BRIEF DESCRIPTION OF THE DRAWINGS

FIGS. 11A to 11D are respectively explanatory views showing examples of optimizing the motion vector.

DETAILED DESCRIPTION OF THE PREFERRED EMBODIMENTS

Hereinafter, embodiments of the present invention will be described in detail with reference to FIG. 1 to FIGS. 11A to 11D.

Figure 1:
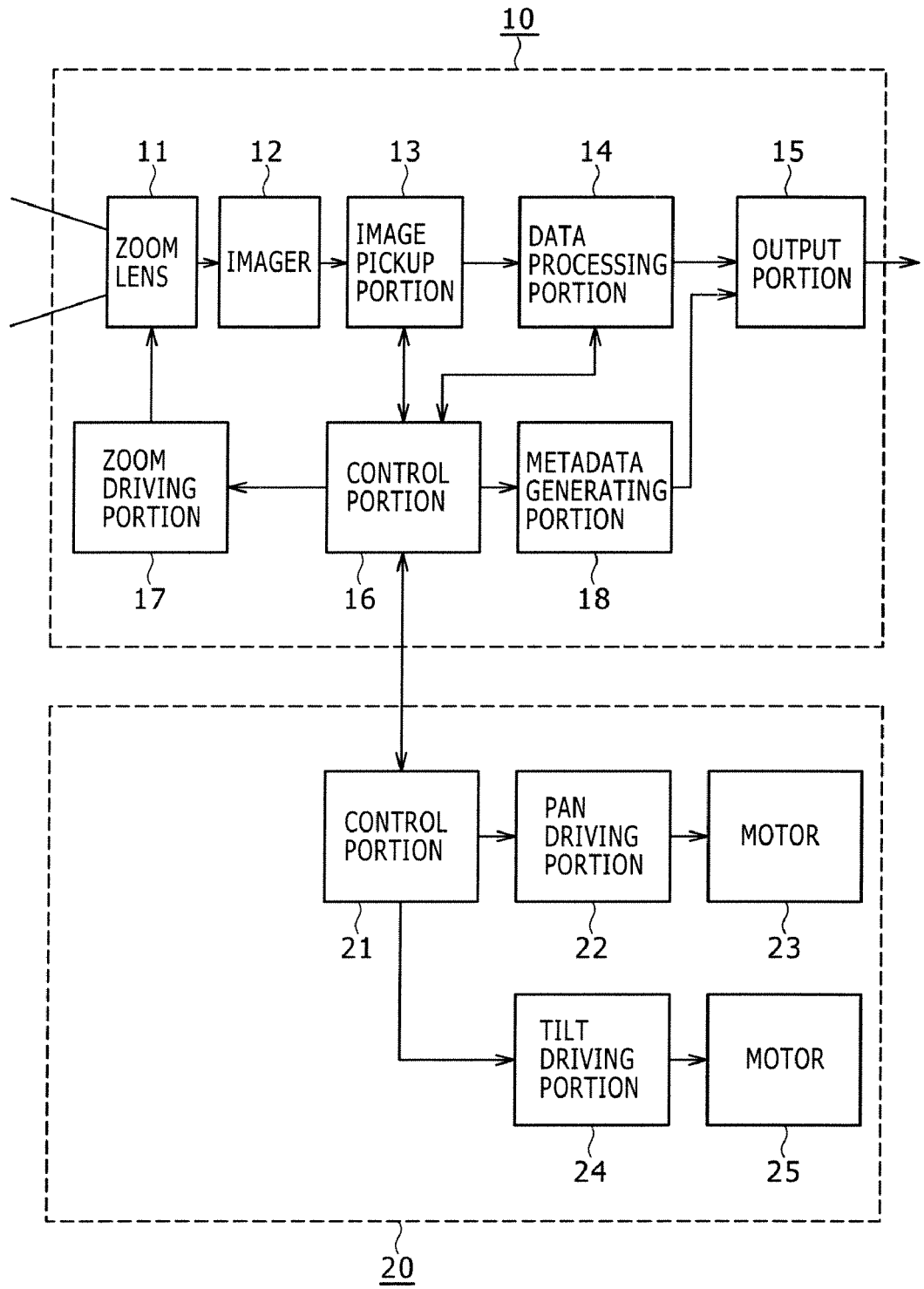
FIG. 1 is a block diagram showing a structure of a monitoring camera according to an embodiment of the present invention.

FIG. 1 is a block diagram showing a structure of an image pickup camera according to an embodiment of the present invention. In this embodiment, the image pickup camera is structured in the form of a monitoring video camera (monitoring camera) for use in monitoring In this case, for example, the monitoring video camera is structured so as to continuously capture a moving image with a given frame period. A monitoring camera 10 is placed on a pan-tilter 20. Thus, the monitoring camera 10 can be rotated in a horizontal direction (in a pan direction) by using the pan-tilter 20. Also, the monitoring camera 10 can be rotated in an elevation direction (in a tilt direction) as well. The rotary drive in the pan-tilter 20 is carried out in accordance with an instruction or the like issued from the monitoring camera 10 side.

Firstly, a structure of the monitoring camera 10 will now be described. A zoom lens 11 having an adjustable angle of field is mounted to the monitoring camera 10. An image light of an object which is obtained through a zoom lens 11 is made incident to an imager 12. A CCD type image pickup element, a MOS type image pickup element or the like, for example, is applied to the imager 12. The angle of view of the zoom lens 11 is automatically adjusted by being driven by a zoom driving portion 17 which will be described later. A lens having a relatively large magnification, for example, is used as the zoom lens 11. The imager 12 outputs an imaging signal based on the image light received thereat. The outputted imaging signal is subjected to imaging signal processing to be made image data (video data) prescribed in an image pickup portion 13.

The image data outputted from the image pickup portion 13 is supplied to a data processing portion 14. The data processing portion 14 executes data processing for processing image data into image data having a predetermined format for transmission. In addition, the data processing portion 14 executes data processing about image processing such as image analyzing processing for discriminating contents of an image from an image represented by image data. In this embodiment, the data processing portion 14 executes discriminating processing for discriminating whether or not a dynamic body image is contained in an image represented by the image data. In a phase of discrimination of the dynamic body, the data processing portion 14 detects a size of the dynamic body (a size in pixel values), and a motion vector value estimating a motion state of the dynamic body. An output portion 15 outputs the image data processed in the data processing portion 14 to the outside.

The image processing for imaging in the image pickup portion 13, and the data processing in the data processing portion 14 are executed in accordance with control made by a control portion 16. The control portion 16, for example, is composed of an arithmetical operation processing unit called a central processing unit (CPU), a memory accompanying the arithmetical operation processing unit, and the like. Control for an imaging state based on the dynamic body detection which will be described later is also carried out in accordance with the control made by the control portion 16.

The control portion 16 controls the zoom driving portion 17, thereby controlling an imaging angle of view. The control for the imaging angle of view, for example, is carried out based on detection of the dynamic body vector. The details of the control state will be described later in explaining a flow chart of FIG. 2. In addition, the control portion 16 may receive an instruction issued from the monitor side for displaying an image corresponding to the image signal sent from the monitoring camera 10, and may adjust the imaging angle of view by controlling the zoom driving portion 17 in accordance with the instruction thus received.

In addition, the control portion 16 causes a metadata generating portion 18 to generate metadata as data on the image contents based on the results of analyzing the image in the data processing portion 14. For example, the control portion 16 causes the metadata generating portion 18 to generate the data on a position of the dynamic body in the image. The output portion 15 adds the metadata thus generated as data which is to accompany the image data to the image data, and supplies the image data and the metadata to the side of the monitor (not shown) for performing the monitoring.

With regard to a structure of the pan-tilter 20 side, the pan-tilter 20 includes a control portion 21 which can transmit data to the control portion 16 on the monitoring camera 10 side. The control portion 16 on the monitoring camera 10 side transmits an instruction to control the drive for the pan-tilter 20 to the control portion 21 based on the state of detection of the dynamic body. A state of transmission of the control instruction will be described later.

When receiving an instruction to adjust a horizontal angle, the control portion 21 issues an instruction corresponding to the instruction to adjust the horizontal angle to a pan driving portion 22. As a result, the pan driving portion 22 drives a motor 23 for rotating the monitoring camera 10 in the horizontal direction. In addition, when receiving an instruction to adjust the elevation, the control portion 21 issues an instruction corresponding thereto to a tilt driving portion 24. As a result, the tilt driving portion 24 drives a motor 25 for rotating the monitoring camera 10 in the elevation direction. Note that, only the structure in which the instructions are issued from the monitoring camera 10 to the pan-tilter 20 side is shown in FIG. 1. However, the pan-tilter 20 can also receive an instruction issued from the monitor side for displaying an image corresponding to the image signal from the monitoring camera 10, thereby performing the adjustment for the horizontal direction and the adjustment for the elevation in accordance with the instruction thus received.

Next, processing for a monitoring operation executed in the monitoring camera 10 of this embodiment will now be described with reference to a flow chart of FIG. 2. Firstly, in the course of performing the imaging for the monitoring, the control portion 16 causes the data processing portion 14 to detect a dynamic body by using the image data supplied to the data processing portion 14 (Step S11). The control portion 16 judges whether or not the dynamic body is detected in the captured image based on this dynamic body detecting processing (Step S12). When judging in Step S12 that no dynamic body is detected therein, the control portion 16 causes the data processing portion 14 to repeatedly execute the dynamic body detecting processing.

On the other hand, when judging in Step S12 that the dynamic body is detected therein, the control portion 16 judges a size of the detected dynamic body, and a velocity vector (motion vector) of the dynamic body (Step S13). The size of the dynamic body is represented by the number of lengthwise pixels, and the number of transverse pixels in the captured image. For size of the dynamic body, for example, the data having the corresponding size is generated when the data processing portion 14 detects the dynamic body. The velocity vector is obtained by vectorizing an amount of motion of the dynamic body per unit time, and a direction of motion of the dynamic body. For example, the data processing portion 14 generates the velocity vector. 1 second, for example, is set as the unit time represented by the velocity vector. The velocity vector thus judged also represents an amount of motion of the dynamic body in the image. The velocity vector estimatedly represents a position of the dynamic body after a lapse of a next unit time (for example, after a lapse of 1 second) from an amount of motion of the dynamic body and a direction of motion of the dynamic body for the past unit time for example (for the past 1 second for example). It is noted that when the velocity vector estimating a position of the dynamic body after a lapse of 1 second is obtained, for example, an amount of motion of the dynamic body for the past 0.1 second may be observed and may be decupled, thereby estimating the velocity vector estimating the position of the dynamic body after a lapse of 1 second.

The velocity vector thus obtained is compared in size with a reference vector (Step S14). Data on the reference vector is previously set in a memory within the control portion 16. When as the result of comparing the velocity vector in size with the reference vector (Step S15), the control portion 16 judges that the velocity vector is larger in size than the reference vector, the control portion 16 issues an instruction to make the sizes of the velocity vector and the reference vector approximately equal to each other to the zoom driving portion 17. As a result, the adjustment by which zoom-out is performed is carried out so that a value of an angle representing the angle of view set for the zoom lens 11 becomes large (that is, comes so as to correspond to the wide field of view) (Step S16).

On the other hand, when as the result of comparison in Step S15, the control portion 16 judges that the velocity vector is smaller in size than the reference vector, the control portion 16 issues an instruction to make the sizes of the velocity vector and the reference vector approximately equal to each other to the zoom driving portion 17. As a result, the adjustment by which zoom-in is performed is carried out so that the value of the angle representing the angle of view set for the zoom lens 11 becomes small (that is, comes to correspond to a telephoto side) (Step S17).

In addition, when the result of comparison in Step S15 shows that the size of the velocity vector is regarded as being approximately equal to that of the reference vector, the angle of view set for the zoom lens 11 is held as it is.

After that time, it is judged whether or not the estimated position of the dynamic body after a lapse of the unit time represented by the velocity vector is located within the captured image (Step S18). An image is continuously captured in this state as long as the estimated position of the dynamic body after a lapse of the unit time represented by the velocity vector is judged to be located within the captured image. On the other hand, when it is judged in Step S18 that the estimated position of the dynamic body after a lapse of the unit time gets out of the range of the captured image, the control portion 16 issues an instruction to the pan-tilter 20. Thus, the pan-tilter 20 moves the monitoring camera 10 in a direction represented by the velocity vector (Step S19). Also, the operation returns back to the dynamic body detecting processing in Step S11.

Figure 3:
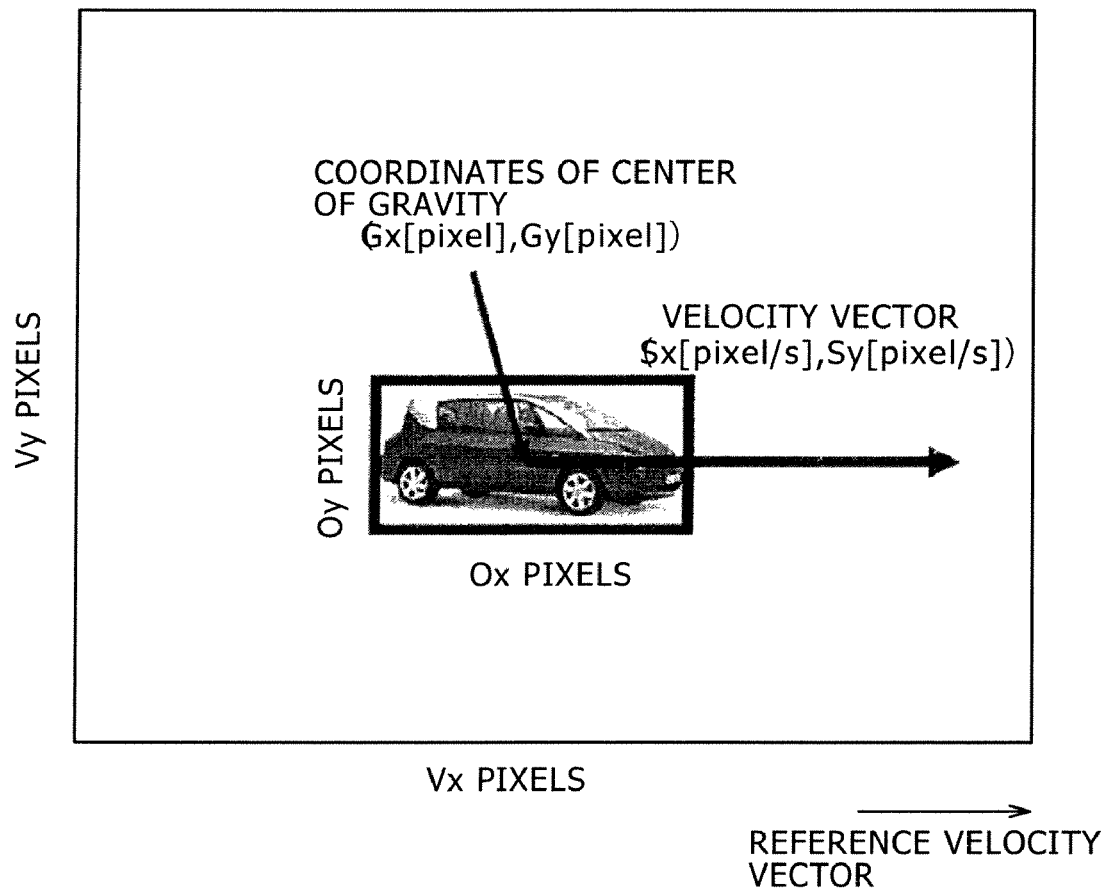
FIG. 3 is an explanatory view showing an example in the case where a motion vector of a dynamic body is large in the imaging method according to the embodiment of the present invention.
Figure 4:
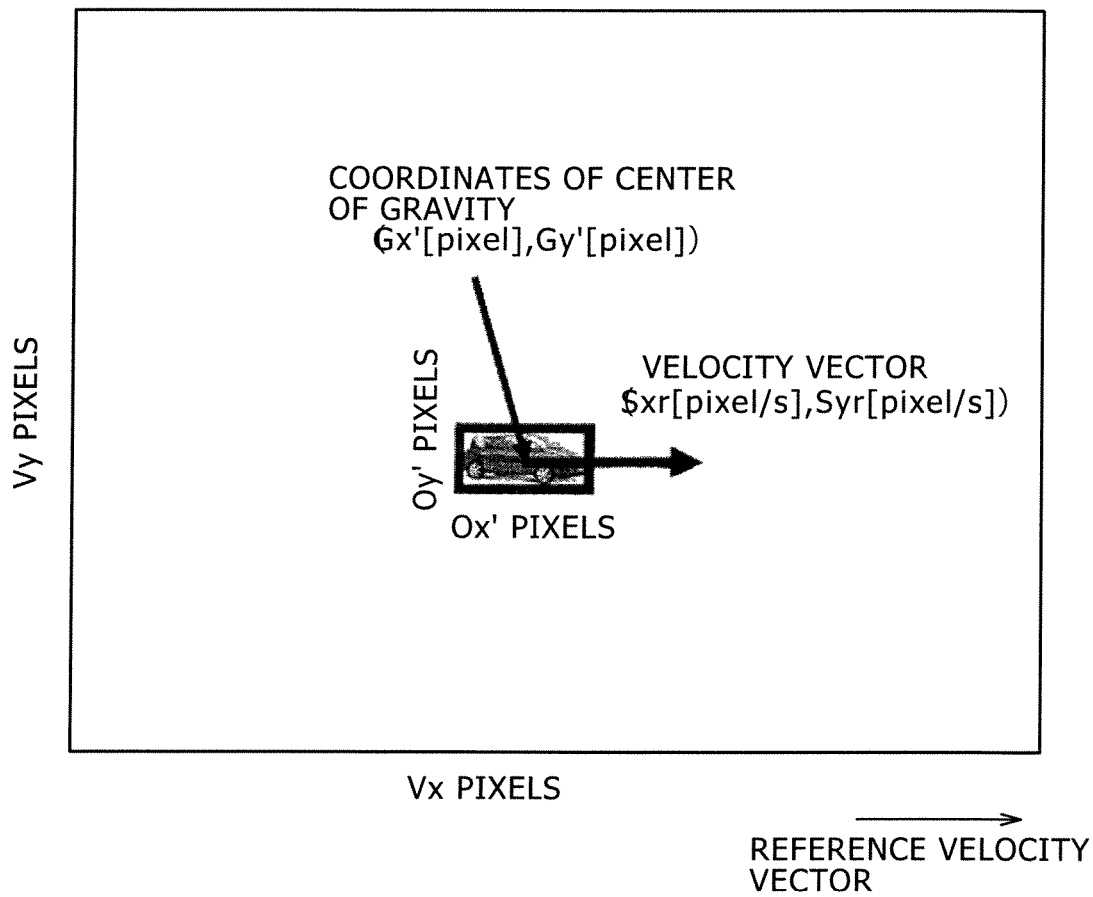
FIG. 4 is an explanatory view showing an example in the case where the motion vector of the dynamic body is proper in the imaging method according to the embodiment of the present invention.
Figure 5:
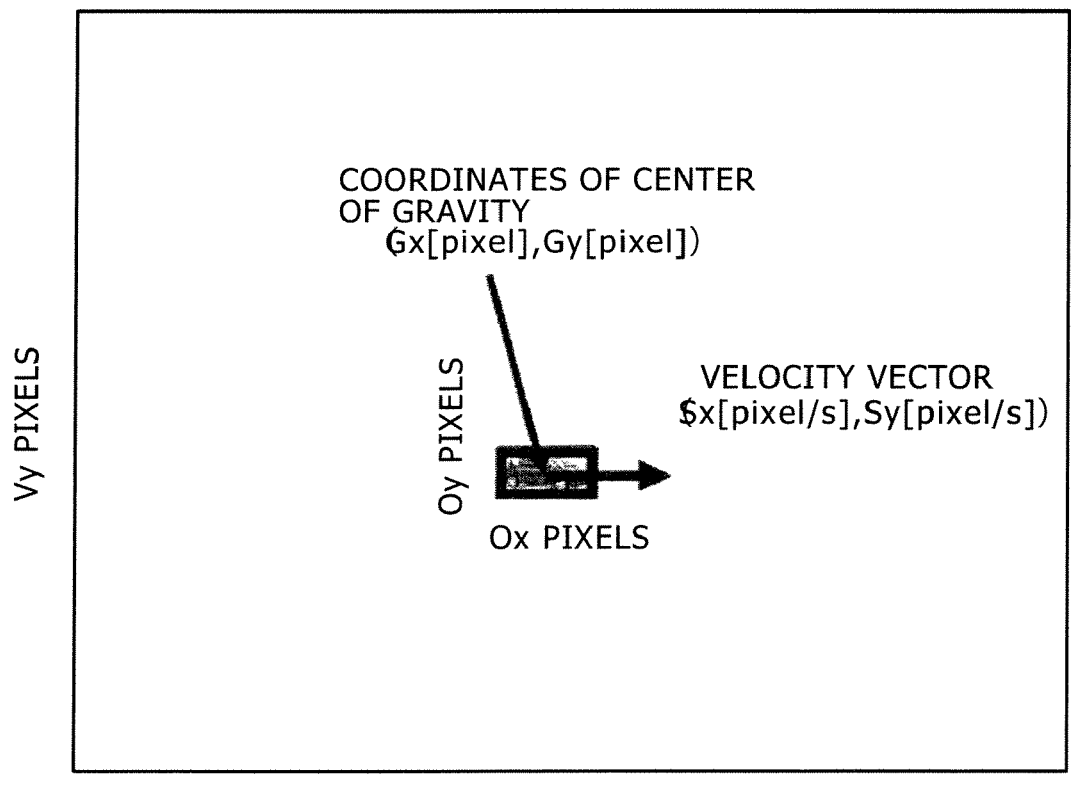
FIG. 5 is an explanatory view showing an example in the case where the motion vector of the dynamic body is small in the imaging method according to the embodiment of the present invention.

FIGS. 3 to 5 are respectively views showing processing examples in the case where the dynamic body (automobile) is detected from the captured image in the manner as described above. In each of these processing examples, it is assumed that Vx pixels exist in a horizontal direction, and Vy pixels exist in a vertical direction. In addition, a size of a reference velocity vector is shown in bottom right of each of FIGS. 3 to 5.

In this case, as shown in FIG. 3, it is assumed that the dynamic body which is represented by Ox pixels in a transverse direction and Oy pixels in a longitudinal direction is detected at a certain photographing angle of view. At this time, the coordinates, Gx, Gy, of a center of the dynamic body are judged. Also, the velocity vector representing the estimated position of the dynamic body after a lapse of the unit time is obtained from the coordinates, Gx, Gy, of the center of the gravity (center) of the dynamic body. In FIG. 3, the velocity vector is represented by an amount, Sx, of horizontal motion, and an amount, Sy, of vertical motion.

In the processing example shown in FIG. 3, the velocity vector is larger in size than the reference velocity vector shown in bottom right of the figure. Thus, the angle of view is adjusted so that the value of the angle representing the angle of view set for the zoom lens 11 comes to correspond to the wide field of view. Also, the angle of view is adjusted for the zoom lens 11 so that the reference velocity vector, and the velocity vector becomes approximately equal to each other. After the angle of view is adjusted in such a manner, the pan-tilter 20 is drive-controlled so as for the monitoring camera 10 to follow the dynamic body detected at that time.

FIG. 4 shows the processing example in which the detected velocity vector Sxr, Syr is approximately equal to the reference velocity vector. In this case, no angle of view is adjusted for the zoom lens 11, and thus the image is captured at the untouched angle of view. Also, the pan-tilter 20 is drive-controlled so as for the monitoring camera 10 to follow the dynamic body detected at that time.

FIG. 5 shows the processing example in which the detected velocity vector Sx, Sy is smaller in size than the reference velocity vector. In the processing example shown in FIG. 5, since the velocity vector is smaller in size than the reference velocity vector shown in bottom right of the figure, the angle of view is adjusted so that the value of the angle representing the angle of view set for the zoom lens 11 comes to correspond to the telephoto side. Also, the angle of view is adjusted for the zoom lens 11 so that the reference velocity vector, and the velocity vector becomes approximately equal to each other. After the angle of view is adjusted in such a manner, the pan-tilter 20 is drive-controlled so as for the monitoring camera 10 to follow the dynamic body detected at that time.

The angle of view is properly adjusted for the zoom lens 11 in the manner as described above, so that the monitoring camera 10 follows the dynamic body. Thus, since the image of the detected dynamic body can be usually captured at the suitable size, the image of the dynamic body can be captured so as for the monitoring camera 10 to follow the dynamic body. Here, since the size of the dynamic body is judged in the form of the number of pixels for the imaging, the image of the dynamic body is usually captured approximately at a given size. As a result, the image of the dynamic body is captured at a given resolution, and thus the satisfactory monitoring is carried out. In addition, capturing the image of the dynamic body at the proper size results in that the imaging following the dynamic body can be satisfactorily carried out, and the excellent monitoring can be performed.

Figure 2:
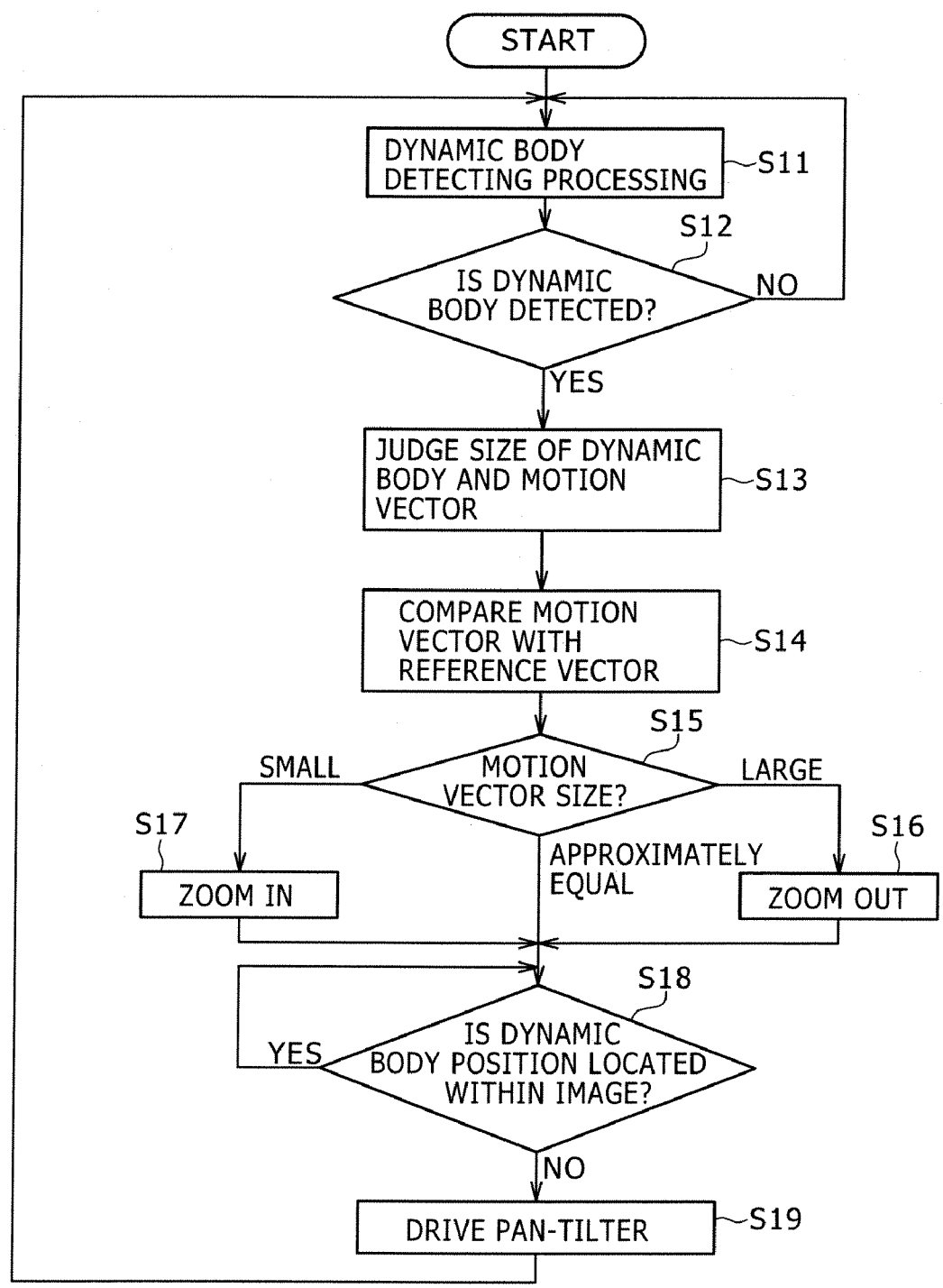
FIG. 2 is a flow chart showing a monitoring operation in a monitoring method according to an embodiment of the present invention.

Note that, in the processing shown in the flow chart of FIG. 2, the processing is executed by paying attention only to the comparison between the size of the motion vector (velocity vector) of the dynamic body, and the size of the reference vector. However, for example, the control may also be carried out based on processing executed such that a range becoming a reference (specification frame) is set in the captured image, and it is judged whether or not the estimated position represented by the velocity vector gets out of the range.

Figure 6:
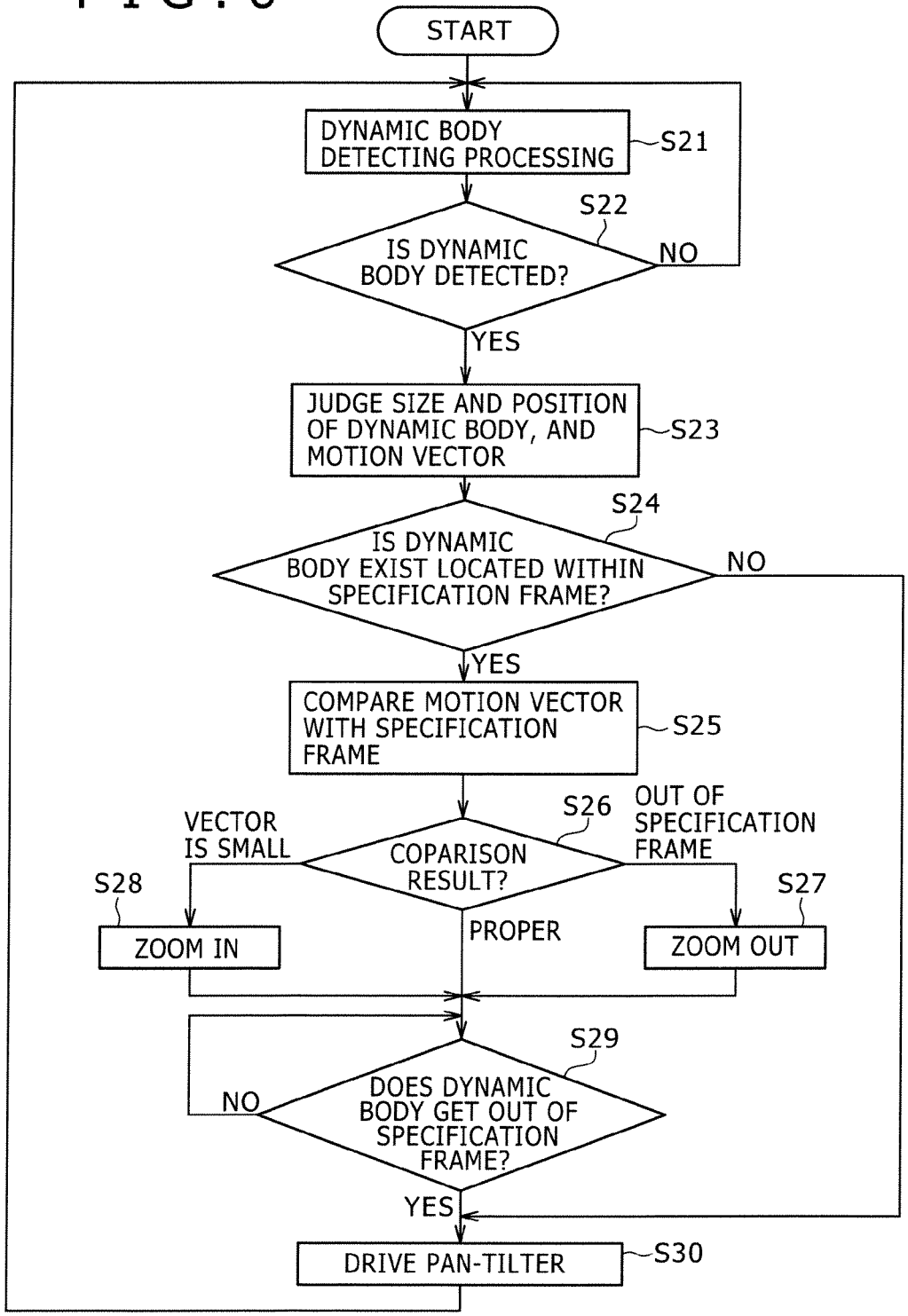
FIG. 6 is a flow chart showing a monitoring operation in a monitoring method according to another embodiment of the present invention.
Figure 7:
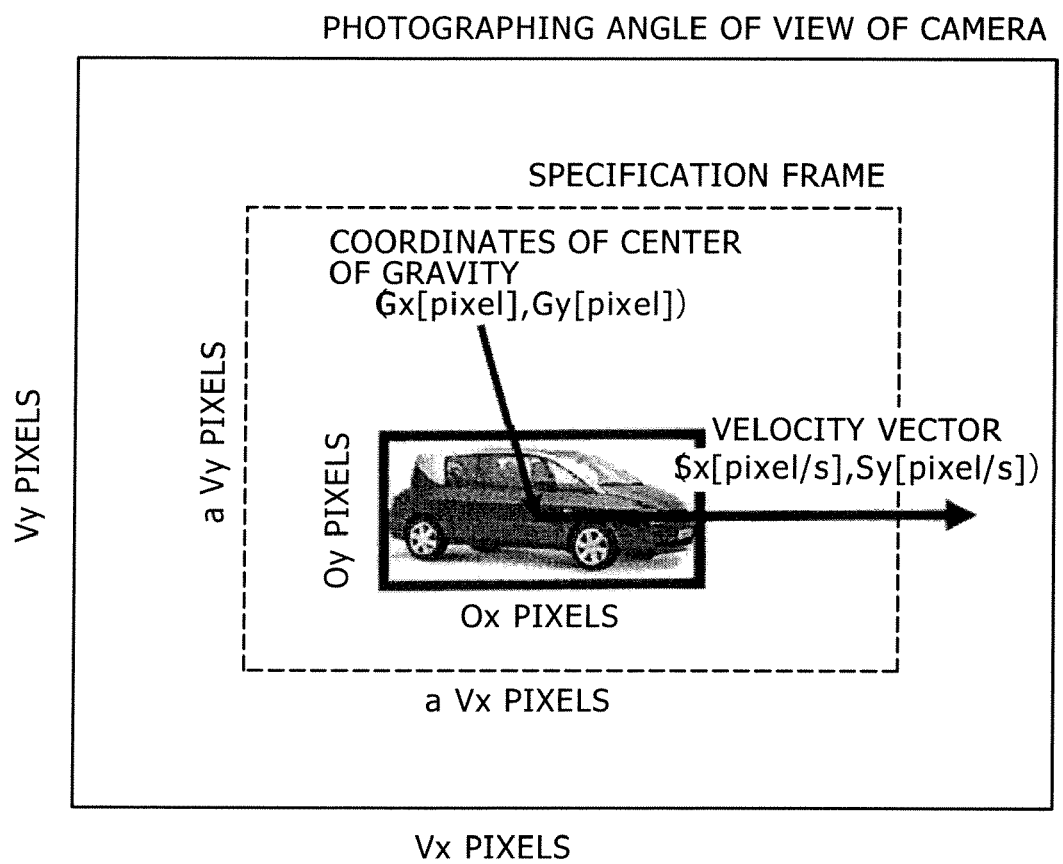
FIG. 7 is an explanatory view showing an example in the case where a motion vector of a dynamic body is large in the imaging method according to the another embodiment of the present invention.

FIG. 6 is a flow chart showing an example of the processing in this case. Firstly, the control portion 16 sets the specification frame in the captured image. For example, as shown in FIG. 7, this specification frame is set as a range into which a range covering the entire captured image is narrowed to some degree.

Then, while the imaging for the monitoring is performed, the control portion 16 causes the data processing portion 14 to detect the dynamic body by using the image data supplied to the data processing portion 14 (Step S21). The control portion 16 judges based on this processing whether or not the dynamic body is detected within the captured image (Step S22). When judging in Step S22 that no dynamic body is detected within the captured image, the control portion 16 causes the data processing portion 14 to repeatedly execute the dynamic body detecting processing in Step S21.

On the other hand, when judging in Step S22 that the dynamic body is detected within the captured image, the control portion 16 judges a size of the dynamic body thus detected, and a velocity vector (motion vector) of the dynamic body thus detected (Step S23). The definition about the size of the dynamic body, and the definition about the velocity vector are the same as those in the processing explained in the flow chart of FIG. 2. Also, the control portion 16 judges whether or not the detected dynamic body is located within the specification frame (Step S24). When judging that the detected dynamic body is located out of the specification frame, the control portion 16 issues an instruction to the pan-tilter 20, thereby performing the setting so that the position of the dynamic body is located within the specification frame (Step S30). After that time, the operation returns back to the processing in Step S21.

On the other hand, when judging in Step S24 that the dynamic body is located within the specification frame, the control portion 16 compares the estimated position of the dynamic body after a lapse of the unit time represented by the velocity vector with the specification frame (Step S25). After that, the control portion 16 performs the judgment about the results of the comparison (Step S26). When judging in Step S26 that the estimated position of the dynamic body after a lapse of the unit time gets out of the specification frame, the control portion 16 issues an instruction to the zoom driving portion 17. Thus, the zoom driving portion 17 performs the adjustment for zoom-out so that the value of the angle representing the angle of view set for the zoom lens 11 becomes large (that is, comes to correspond to the wide field of view) (Step S27).

When judging in Step S26 that the size of the velocity vector is much smaller than that of the specification frame, the control portion 16 issues an instruction to the zoom driving portion 17. Thus, the zoom driving portion 17 performs the adjustment for the zoom-in so that the value of the angle representing the angle of view set for the zoom lens 11 becomes small (that is, comes to correspond to the telephoto side) (Step S28).

On the other hand, when the control portion 16 judges in Step S26 that the estimated position of the dynamic body represented by the velocity vector is located within the specification frame, the angle of view set for the zoom lens 11 is held as it is.

After that time, the control portion 16 judges whether or not the estimated position of the dynamic body after a lapse of the unit time represented by the velocity vector is located within the specification frame (Step S29). The image is continuously captured in the untouched state as long as the results of the judgment in Step S29 show that the estimated position of the dynamic body after a lapse of the unit time represented by the velocity vector is located within the specification frame. On the other hand, when judging in Step S29 that the estimated position of the dynamic body after a lapse of the unit time gets out of the captured image, the control portion 16 issues an instruction to the pan-tilter 20. Thus, the pan-tilter 20 movies the monitoring camera 10 in a direction represented by the velocity vector (Step S30). Then, the operation returns back to the dynamic body detecting processing in Step S21.

FIGS. 7 to 10 are respectively views in the case where the dynamic body (automobile) is detected from the captured image in the manner as described above. In each of these examples shown in FIGS. 7 to 10, respectively, it is assumed that for the captured image, Vx pixels exist in the horizontal direction, and Vy pixels exist in the vertical direction.

Figure 8:
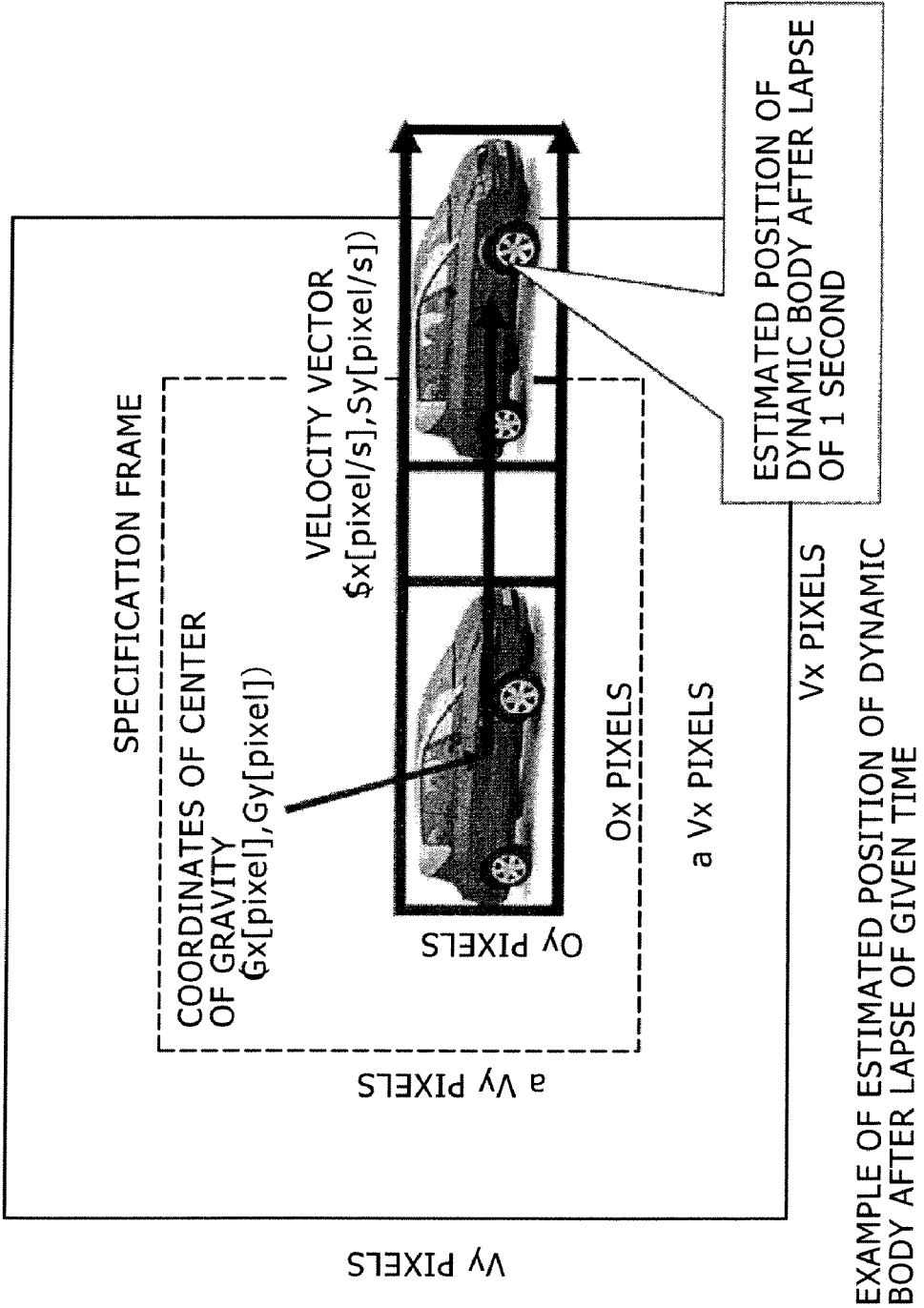
FIG. 8 is an explanatory view showing an example of an estimated position of a dynamic body in the monitoring method according to the another embodiment of the present invention.

In this case, as shown in FIG. 7, it is also assumed that the dynamic body represented by transverse Ox pixels and longitudinal Oy pixels is detected at a certain photographing angle of view. At this time, the coordinates, Gx, Gy, of the center of the dynamic body are judged, and thus the velocity vector Sx, Sy representing the estimated position of the dynamic body after a lapse of the unit time is obtained from the coordinates, Gx, Gy, of the center of gravity (center) of the dynamic body. FIG. 7 shows the example in which the estimated position (the position of the center of gravity) of the dynamic body after a lapse of the unit time represented by that velocity vector gets out of the specification frame. In the case of such an example, the angle of view is adjusted so that the value of the angle representing the angle of view set for the zoom lens 11 comes so as to correspond to the wide field of view. Also, the angle of view is adjusted for the zoom lens 11 so that the size of the dynamic body becomes suitable one. After the angle of view is adjusted in such a manner, the pan-tilter 20 is drive-controlled so as for the monitoring camera 10 to follow the dynamic body detected at that time. When no angle of view is adjusted for the zoom lens 11 in the state shown in FIG. 7, as shown in FIG. 8, since the dynamic body gets out of the specification frame, this is unpreferable. However, the adjusting of the angle of view results in that the capturing of the image in the state as shown in FIG. 8 can be effectively prevented.

Figure 9:
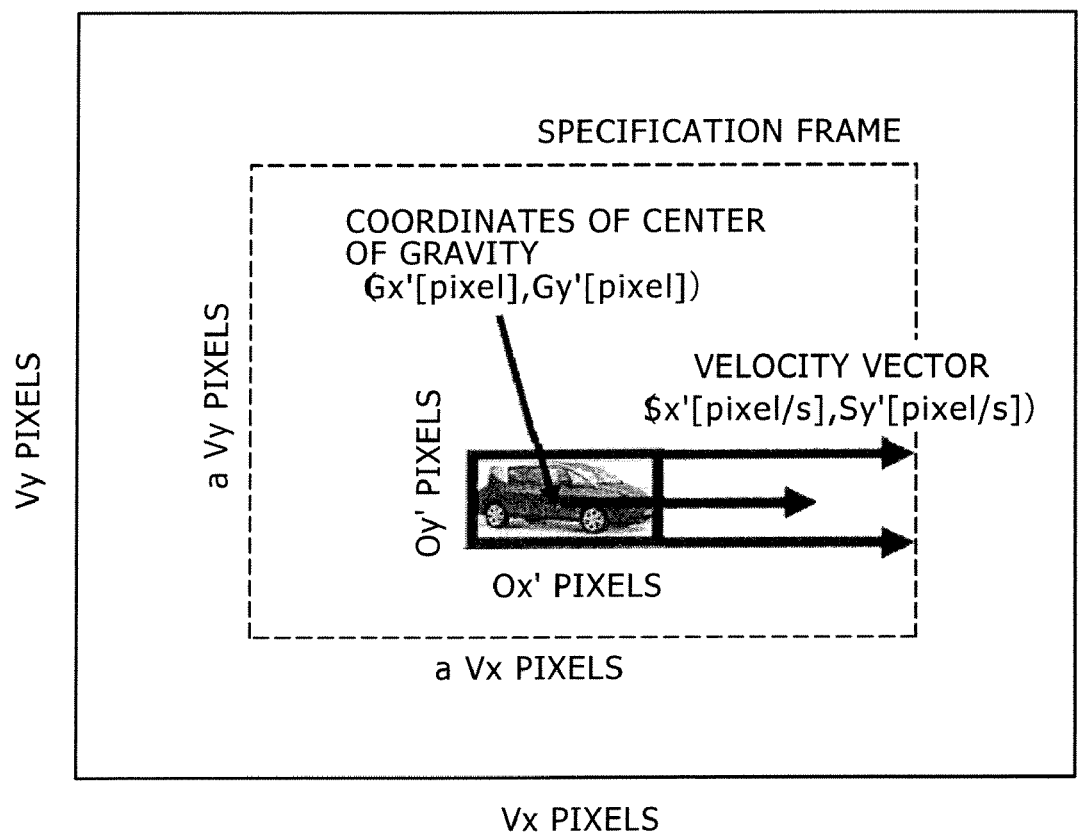
FIG. 9 is an explanatory view showing an example in the case where the motion vector of the dynamic body is proper in the imaging method according to the another embodiment of the present invention.

FIG. 9 shows an example in the case where the estimated position represented by the detected velocity vector Sx', Sy' is located within the specification frame. In this case, the image is captured at the untouched angle of view without adjusting the angle of view for the zoom lens 11. Also, the pan-tilter 20 is drive-controlled so as for the monitoring camera 10 to follow the dynamic body detected at that time.

Figure 10:
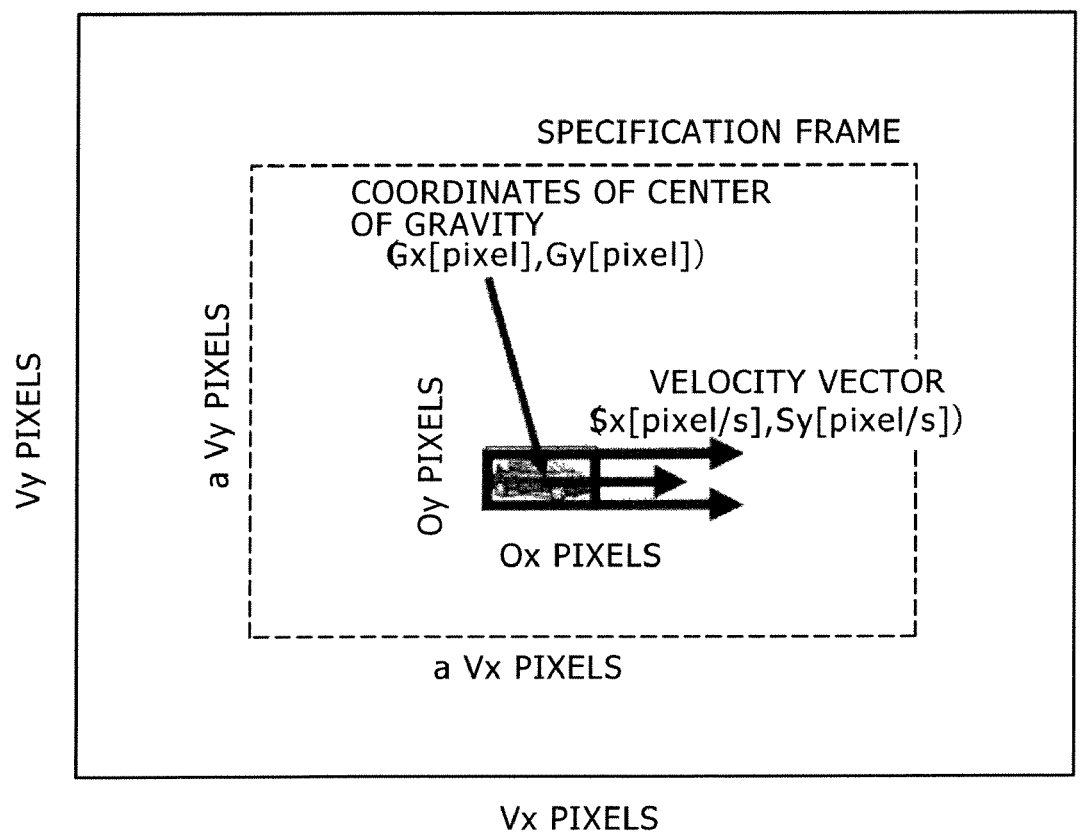
FIG. 10 is an explanatory view showing an example in the case where the motion vector of the dynamic body is small in the imaging method according to the another embodiment of the present invention.

FIG. 10 shows an example in the case where the detected velocity vector Sx, Sy is excessively smaller than the size of the specification frame. In the example shown in FIG. 10, the velocity vector is much smaller in size than the specification frame. Thus, the angle of view is adjusted so that the value of the angle representing the angle of view set for the zoom lens 11 comes to correspond to the telephoto side. Also, the angle of view is adjusted for the zoom lens 11 so that the detected dynamic body has the proper size. After the angle of view is adjusted in such a manner, the pan-tilter 20 is drive-controlled so as for the monitoring camera 10 to follow the dynamic body detected at that time.

The specification frame is set within the captured image and the size of the detected dynamic body is compared with the specification frame thus set in the manner as described above, thereby making it possible to more effectively monitor the dynamic body.

Note that, in each of the examples shown in FIGS. 3 to 5, respectively, and each of the examples shown in FIGS. 7 to 10, respectively, the velocity vector which moves approximately in the horizontal direction has been described. However, when the comprehensive velocity vector is obtained by judging an amount of horizontal motion, and an amount of vertical motion, either the case where the optimization in a circle mode is performed as shown in FIG. 11A, and the case where the optimization in a rectangle mode is performed as shown in FIG. 11B may be available. That is to say, in the case of the circle mode shown in FIG. 11A, when the amount of horizontal motion is equal to the amount of vertical motion, a value of the optimized velocity vector becomes equal to each of the amount of horizontal motion and the amount of vertical motion. On the other hand, in the case of the rectangle mode shown in FIG. 11B, when an amount of horizontal motion, and an amount of vertical motion are equal to each other, the optimized vector is determined so as to obliquely extend within a rectangular figure represented by the vectors extending in both the directions, respectively. Therefore, when an amount of horizontal motion, and an amount of vertical motion are not equal to each other, a value of an optimized vector is set as shown in FIGS. 11C and 11D.

It should be understood by those skilled in the art that various modifications, combinations, sub-combinations and alterations may occur depending on design requirements and other factors insofar as they are within the scope of the appended claims or the equivalents thereof.

What is claimed is:
1. An image pickup apparatus to which a zoom lens having a variable imaging angle of view is mounted, comprising:
 a dynamic body detecting portion for detecting a dynamic body from an image signal obtained by capturing an image;
 a motion vector detecting portion for detecting a motion vector representing an amount of motion per unit time of said dynamic body detected by said dynamic body detecting portion;
 a comparing portion for comparing the motion vector detected by said motion vector detecting portion with a reference value; and
 a control portion for adjusting a set value for an angle of view of said zoom lens based on a comparison result obtained in said comparing portion,
 wherein the adjustment for the set value for the angle of view by said control portion is performed such that the angle of view is increased when the detected motion vector is larger than the reference value, the angle of view is decreased when the detected motion vector is smaller than the reference value, and no angle of view is changed when the detected motion vector is approximately equal to the reference value.

2. The image pickup apparatus according to claim 1, further comprising:
 a moving portion for moving a direction along which the image is captured by said zoom lens,
 wherein said moving portion moves the direction along which the image is captured based on a position of said dynamic body detected by said dynamic body detecting portion and/or the motion vector detected by said motion vector detecting portion.

3. The image pickup apparatus according to claim 1, wherein the adjustment for the set value for the angle of view by said control portion is performed such that it is judged based on the detected motion vector whether or not a position of said dynamic body after a lapse of a unit time is located within a specific range set in the image, and the angle of view is increased when the position of said dynamic body after a lapse of the unit time is estimated to be out of the specific range.

4. An imaging method of capturing an image by using a zoom lens having a variable imaging angle of view, comprising the steps of:
 detecting a dynamic body from an image signal obtained by capturing the image;
 detecting a motion vector representing an amount of motion per unit time of said dynamic body detected in said dynamic body detecting step;
 comparing the motion vector detected in said dynamic body detecting step with a reference value; and
 adjusting a set value for an angle of view of said zoom lens based on a comparison result,
 wherein the adjustment for the set value for the angle of view by said control portion is performed such that the angle of view is increased when the detected motion vector is larger than the reference value, the angle of view is decreased when the detected motion vector is smaller than the reference value, and no angle of view is changed when the detected motion vector is approximately equal to the reference value.

* * * * *